Figure 3:
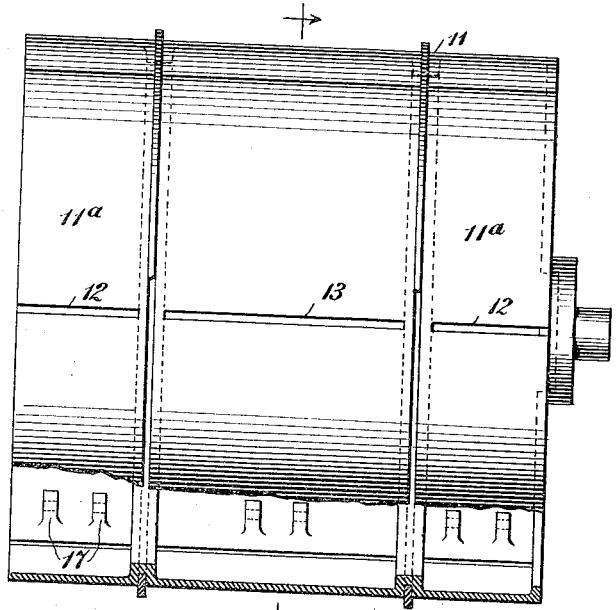

S. D. SIMMONS.
ROTARY ENGINE.
APPLICATION FILED FEB. 21, 1914.
1,125,599.
Patented Jan. 19, 1915.
2 SHEETS—SHEET 1.
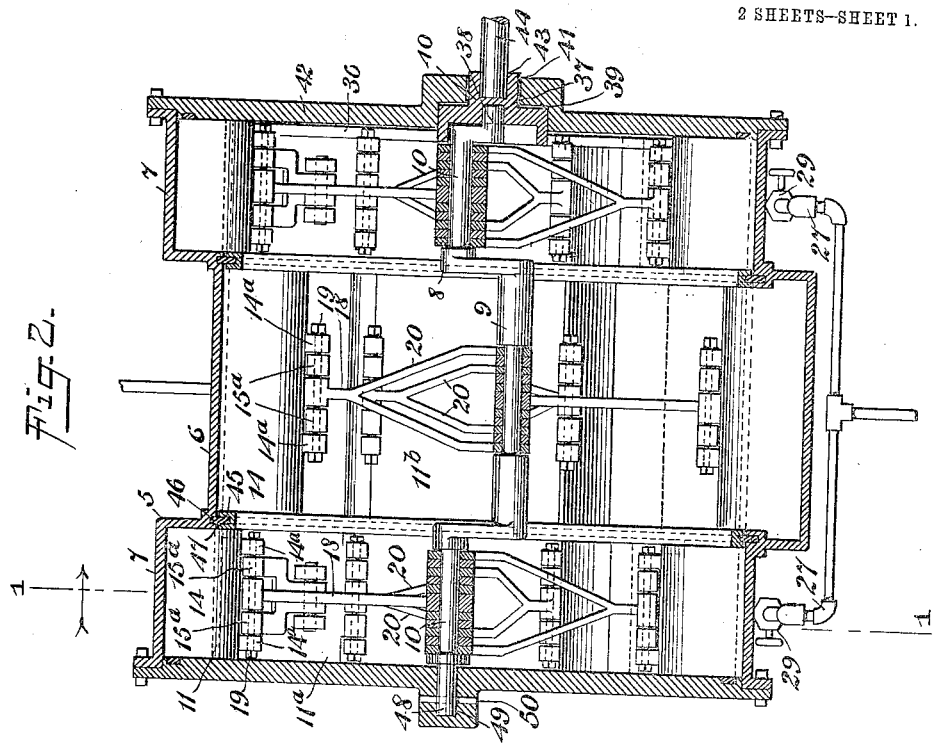
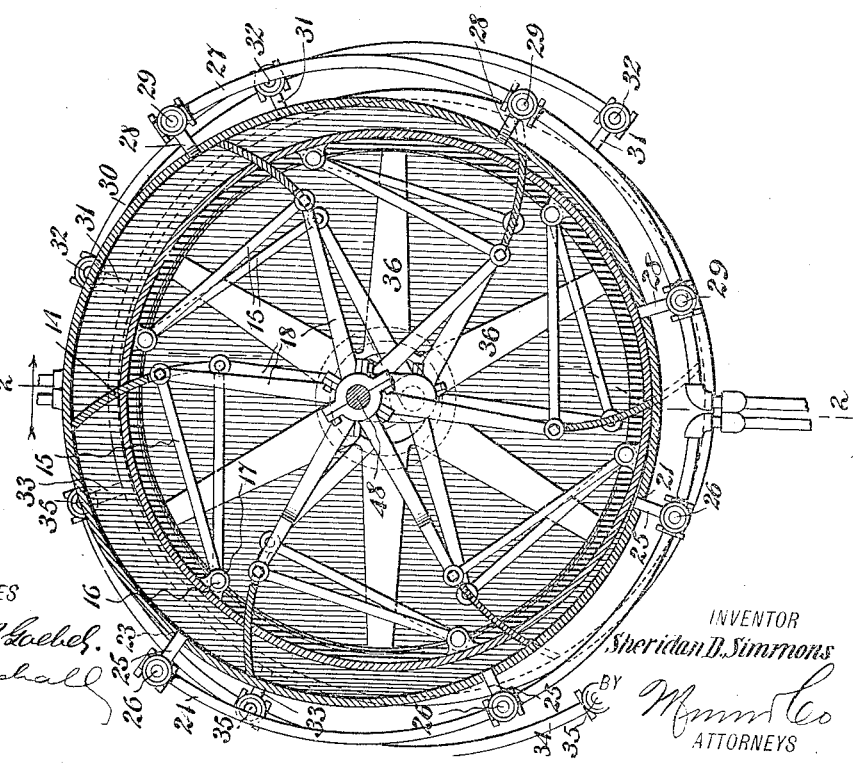
INVENTOR
Sheridan D. Simmons
BY
ATTORNEYS
WITNESSES

S. D. SIMMONS.
ROTARY ENGINE.
APPLICATION FILED FEB. 21, 1914.

1,125,599.

Patented Jan. 19, 1915.
2 SHEETS—SHEET 2.

WITNESSES
William P. Goebel
E. B. Marshall

INVENTOR
Sheridan D. Simmons
BY Munn & Co
ATTORNEYS

UNITED STATES PATENT OFFICE.

SHERIDAN D. SIMMONS, OF NEW YORK, N. Y., ASSIGNOR OF ONE-HALF TO HENRY AMLING, OF NEW YORK, N. Y.

ROTARY ENGINE.

1,125,599.  Specification of Letters Patent.  Patented Jan. 19, 1915.

Application filed February 21, 1914. Serial No. 820,191.

*To all whom it may concern:*

Be it known that I, SHERIDAN D. SIMMONS, a citizen of the United States, and a resident of New York city, borough of the Bronx, county of the Bronx, and State of New York, have invented a new and Improved Rotary Engine, of which the following is a full, clear, and exact description.

My invention has for its object to provide a rotary engine having blades extending through slots in a rotatable drum disposed in a casing and eccentric with a shaft, a portion of the casing being eccentric with an adjacent portion of the casing, and the shaft being provided with a crank disposed in the said adjacent portion of the casing.

Still other objects of the invention will appear in the following specification in which the preferred form of my invention is disclosed.

In the drawings similar reference characters refer to similar parts in all the views in which—

Figure 4:
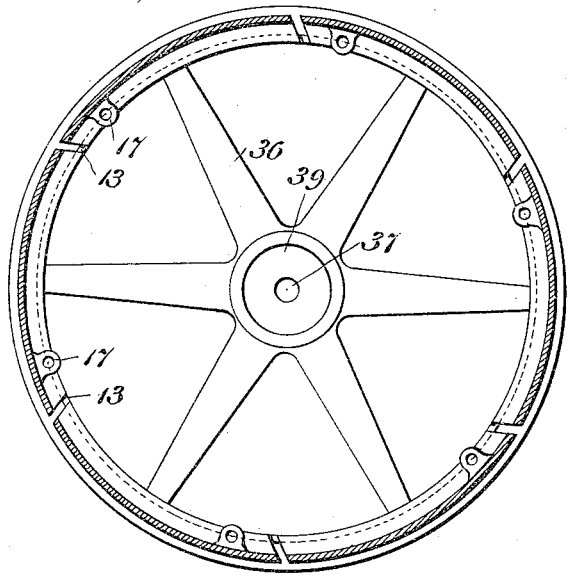

Figure 1 is a sectional view on the line 1—1 of Fig. 2; Fig. 2 is a sectional view on the line 2—2 of Fig. 1; Fig. 3 is a view showing the drum with parts broken away to show the lugs to which the radius rods are pivoted; and Fig. 4 is a sectional view on the line 4—4 of Fig. 3.

By referring to the drawings, it will be seen that a casing 5 is provided, this casing having a central portion 6 which is eccentric with reference to the side portion 7. Within the casing 5 there is a shaft 8 which has its central portion set off to form a crank at 9 and which is disposed substantially concentric with the central portion 6 of the casing, the ends 10 of the shaft 8 being disposed substantially concentric with the sides 7 of the casing. Within the casing 5 there is disposed a drum 11, one side of which is disposed substantially at the inner side of the central portion 6 of the casing 5, while the other side and the ends of the drum are disposed substantially at the inner sides at the sides 7 of the casing. In Fig. 2 of the drawings it will be seen that the top of the drum 11 is disposed adjacent the top of the central portion 6 of the casing 5 and that the sides at the bottom of the drum 11 are disposed adjacent the bottom of the sides 7 of the casing.

At the sides 11ª of the drum 11 there are horizontally disposed slots 12 and in the central portion 11ᵇ of the drum 11 there are slots 13, blades 14 being disposed through the slots 12 and through the slots 13, the blades 14 extending to points adjacent the casing 5. The blades 14 are pivoted to radius rods 15 which are fulcrumed by pins 16 to the lugs 17 which extend inwardly from the drum, the blades 14 being curved substantially concentric with the pins 16. The blades 14 are also connected with the shaft by means of the links 18. As best shown in Fig. 2 of the drawings, the links 18 are disposed between the arms 15ª of the radius rods 15, the lugs 14ª of the blades 14 being disposed at the outer side of the arms 15ª and a pin 19 being disposed through orifices in the lugs 14ª in the arms 15ª and in the links 18, the links 18 having arms 20 which are mounted on the shaft 8, the arms 20 which are connected with each of the blades 14, being disposed at the sides of arms on the links 18 which are connected with blades adjacent the first mentioned blades.

By referring to Fig. 1 of the drawings it will be seen that steam or other gas under pressure may be introduced in the casing at the points 21, 22 and 23 through the pipe 24 and the branches 25, the communication between the pipe 24 and the branches 25 being controlled by valves 26. At the other side of the casing there are pipes 27 which have branches 28 communicating with the interior of the ends 7 of the casing, the communication between the branches 28 and the pipes 27, being controlled by the valves 29. This construction is provided so that the steam or other gas under pressure may be introduced into the left hand portions of the ends 7 of the casing as shown in Fig. 1, this steam or other gas under pressure acting against the blades 14 to rotate the blades 14 and with it the drum 11 in the casing. The steam or other gas under pressure is introduced into the central portion 6 of the casing by the pipe 30 and the branches 31, the communication between the pipe 30 and the branches 31 being controlled by the valves 32. In this way with the rotation of the drum the sides of the drum will be acted on by the steam or other gas under pressure when moving at the left hand portion, the top and right hand portion of the casing while the blades 14 on the central portion of the drum will be acted on by the steam during their movement at the right hand portion, the lower portion and the left hand portion of the casing. All the blades 14 are mounted on the drum and on the shaft in the manner which has been described. The steam or other gas under pressure which acts against the blades 14 which move the ends 7 of the casing 5 is exhausted through the branches 28 of the pipe 27 and the steam which acts on the blades 14 which move in the central portion 6 of the casing is exhausted at the branches 33 of the pipe 34, the communication between the branches 33 and the pipe 34 being controlled by the valves 35.

It will be understood that the top of the central portion of the drum 11 will be disposed adjacent the top of the casing 5 while at the bottom the ends of the drum will be disposed adjacent the bottom of the ends 7 of the casing. In this way the drum will be supported during its rotation.

As best shown in Fig. 4 of the drawings one end of the drum is provided with spokes 36 which have a bearing 37 in which a crank 38 on the shaft 9 is journaled, there being a cutaway portion 39 in the hub to which the spokes 36 are secured for the free movement of the end of the shaft 10 at the crank 38. The hub 40 to which the spokes 36 are secured, is journaled in a bearing 41 in the end 42 of the casing and this hub 40 has a recessed portion 43 for receiving an angular or other member 44 for rotating the said angular or other member 44 with the rotation of the drum 11. The drum 11 has annular recesses 45 which face the recesses 46 in the casing 5, packing rings 47 being disposed in these recesses to prevent the steam between the ends 7 and the drum 11 from moving to the central portion 6 of the casing.

The end 48 of the shaft is held against rotation in its bearing 49 by the pin 50.

The engine is balanced, reversible and may be run on high intermediate and low pressure or high and intermediate or high pressure and it may be adjusted as may be desired.

As the engine is constructed there is no dead center.

Having thus described my invention I claim as new and desire to secure by Letters Patent:

1. In a rotary engine, a casing having two portions disposed end to end and eccentric relatively to each other, a drum rotatably disposed in both portions of the casing and eccentric relatively to the said portions, there being a plurality of transverse slots in the drum disposed in each portion of the casing, blades movably disposed in the slots, means for guiding the blades in the slots as the drum rotates, two pipes, one at one side of the casing, branches connecting the last mentioned pipe with the said side of the casing at points spaced apart around one of its said portions, the other pipe being disposed at the other side of the casing, and branches connecting the other pipe with the casing at points spaced apart at the said other side of the casing and at its other portion.

2. In a rotary engine, a casing, a drum rotatably disposed in the casing and eccentric relatively thereto, there being a plurality of transverse parallel slots spaced apart around the drum, blades movably disposed in the slots, means for guiding the blades in the slots as the drum rotates, two pipes, one at each side of the casing, the two pipes extending around the axes of the casing and the drum, branches connecting one of the pipes with the casing at points spaced apart around one side of the casing, and branches connecting the other pipe at points spaced apart around the other side of the casing.

3. In a rotary engine, a casing, a drum rotatably disposed in the casing and eccentric relatively thereto, there being a plurality of transverse parallel slots spaced apart around the drum, blades movably disposed in the slots, means for guiding the blades in the slots as the drum rotates, two pipes, one at each side of the casing, the two pipes extending around the axes of the casing and the drum, branches connecting one of the pipes with the casing at points spaced apart around one side of the casing, branches connecting the other pipe at points spaced apart around the other side of the casing, and valves commanding communication between the pipes and the branches.

4. In a rotary engine, a casing having a first and a second portion, disposed end to end and eccentric relatively to each other, a drum rotatably disposed in both portions of the casing and eccentric relatively to the said portions, there being a plurality of transverse slots disposed around the drum in one of the said portions of the casing, there being a plurality of slots around the drum and disposed in the other portion of the casing, blades movably disposed in the slots, means for guiding the blades in the slots, two pipes, branches connecting one of the pipes with the first portion of the casing at points spaced apart around one side of the casing, branches connecting the other pipe with the second portion of the casing at points spaced apart around the said side of the casing, two additional pipes, branches connecting one of the additional pipes with the first portion of the casing at points spaced apart around the other side of the casing, and branches connecting the other additional pipe with the second mentioned portion of the casing at points spaced apart around the other said side of the casing.

5. In a rotary engine, a casing having a first and a second portion, disposed end to end and eccentric relatively to each other, a drum rotatably disposed in both portions of the casing and eccentric relatively to the said portions, there being a plurality of transverse slots disposed around the drum in one of the said portions of the casing, there being a plurality of slots around the drum and disposed in the other portion of the casing, blades movably disposed in the slots, means for guiding the blades in the slots, two pipes, branches connecting one of the pipes with the first portion of the casing at points spaced apart around one side of the casing, branches connecting the other pipe with the second portion of the casing at points spaced apart around the said side of the casing, two additional pipes, branches connecting one of the additional pipes with the first portion of the casing at points spaced apart around the other side of the casing, branches connecting the other additional pipe with the second mentioned portion of the casing at points spaced apart around the other said side of the casing, and valves commanding communication between the pipes and the branches.

6. In a rotary engine, a casing having a first and a second portion, disposed end to end and eccentric relatively to each other, a drum rotatably disposed in both portions of the casing and eccentric relatively to the said portions, there being a plurality of transverse slots disposed around the drum in one of the said portions of the casing, there being a plurality of slots around the drum and disposed in the other portion of the casing, blades movably disposed in the slots, means for guiding the blades in the slots, two pipes, branches connecting one of the pipes with the first portion of the casing at points spaced apart around one side of the casing, branches connecting the other pipe with the second portion of the casing at points spaced apart around the said side of the casing, two additional pipes, branches connecting one of the additional pipes with the first portion of the casing at points spaced apart around the other side of the casing, branches connecting the other additional pipe with the second mentioned portion of the casing at points spaced apart around the other said side of the casing, and means to prevent the passage of a fluid from one portion of the casing to the other between the drum and the outer wall of the casing.

7. In a rotary engine, a casing having a first and a second portion disposed end to end and eccentric relatively to each other, a drum rotatably disposed in both portions of the casing, blades on the drum, two pipes, branches connecting one of the pipes with the first portion of the casing at points spaced apart around one side of the casing, branches connecting the other pipe with the second portion of the casing at points spaced apart around the said side of the casing, two additional pipes, branches connecting one of the additional pipes with the first portion of the casing at points spaced apart around the other side of the casing, and branches connecting the other additional pipe with the second mentioned portion of the casing at points spaced apart around the other said side of the casing.

8. In a rotary engine, a casing having a first and a second portion disposed end to end and eccentric relatively to each other, a drum rotatably disposed in both portions of the casing, blades on the drum, two pipes, branches connecting one of the pipes with the first portion of the casing at points spaced apart around one side of the casing, branches connecting the other pipe with the second portion of the casing at points spaced apart around the said side of the casing, two additional pipes, branches connecting one of the additional pipes with the first portion of the casing at points spaced apart around the other side of the casing, branches connecting the other additional pipe with the second mentioned portion of the casing at points spaced apart around the other said side of the casing, and means to prevent the passage of a fluid from one portion of the casing to the other between the drum and the outer wall of the casing.

In witness whereof I have signed my name to this specification in the presence of the two subscribing witnesses.

SHERIDAN D. SIMMONS.

Witnesses:
 EVERARD B. MARSHALL,
 PHILIP D. ROLLHAUS.

Copies of this patent may be obtained for five cents each, by addressing the "Commissioner of Patents, Washington, D. C."